United States Patent
Cullen et al.

[11] 3,883,313
[45] May 13, 1975

[54] MODIFIED CZOCHRALSKI-GROWN MAGNESIUM ALUMINATE SPINEL AND METHOD OF MAKING SAME

[75] Inventors: Glenn Wherry Cullen, Princeton, N.J.; Stephen Ray Bolin, Reading, Mass.; John Francis Corboy, Ringoes, N.J.; John Elvin Creamer, San Juan Capistrano, Calif.; Alan John Wasielewski, Beachwood, N.J.

[73] Assignee: RCA Corporation, New York, N.Y.

[22] Filed: Dec. 14, 1972

[21] Appl. No.: 314,974

[52] U.S. Cl............. 23/301 SP; 23/304; 23/305; 252/521
[51] Int. Cl........ B01j 17/24; C01f 7/02; H01h 3/10
[58] Field of Search............. 23/301 SP, 304, 305; 252/521

[56] References Cited
UNITED STATES PATENTS

| | | |
|---|---|---|
| 3,457,033 | 7/1969 | Gatti et al. ............... 23/301 SP |
| 3,595,803 | 7/1971 | Dugger ..................... 23/305 |
| 3,619,131 | 11/1971 | Grabmaier ................. 23/305 |
| 3,625,868 | 12/1971 | Grabmaier ............. 23/301 SP |
| 3,658,586 | 4/1972 | Wang ........................ 23/304 |

Primary Examiner—Wilbur L. Bascomb, Jr.
Assistant Examiner—Darrell Sanders
Attorney, Agent, or Firm—Glenn H. Bruestle; W. S. Hill

[57] ABSTRACT

A modified, Czochralski-grown, single-crystalline spinel has a nominal composition $(MgO)(Al_2O_3)_x$, where $x$ can be between 1 and 2.3. The spinel has an (OH) ion content in its lattice that is related to the infra-red absorption coefficient $\alpha$, where $\alpha$ varies with the $MgO/Al_2O_3$ ratio and at wave number 3360 $cm^{-1}$ can be between 0.3 and 3.0 $cm^{-1}$. The novel spinel is grown by a modified Czochralski method wherein the spinel is pulled from a melt of MgO and $Al_2O_3$ in an ambient, comprising between 0.2% and 2.0% oxygen, an inert gas, and water vapor substantially saturating (90 – 100% relative humidity) the ambient.

7 Claims, 2 Drawing Figures

3,883,313

MODIFIED CZOCHRALSKI-GROWN MAGNESIUM ALUMINATE SPINEL AND METHOD OF MAKING SAME

BACKGROUND OF THE INVENTION

This invention relates to modified Czochralski-grown magnesium aluminate spinel and a modified Czochralski method of making same. The modified Czochralski-grown spinel and method of making same are particularly useful for providing a substrate surface upon which a thin layer of a semiconductor material, such as silicon or gallium arsenide, for example, can be deposited epitaxially for use in the electronic arts.

It has been proposed to use magnesium aluminate spinel as a substrate for a layer, of about one micron or less in thickness, of epitaxial silicon to provide excellent dielectric isolation and a minimum of parasitic capacitances in electronic integrated circuits. Most of the prior-art spinels used as substrates for epitaxial silicon layers were single crystals prepared by the flame-fusion process. For specific doping types and silicon orientations, improved semiconducting properties were realized in silicon epitaxially deposited on flame-fusion spinel. A disadvantage of flame-fusion spinel, however, is that it is relatively difficult to produce crystals of large diameter (2 inches or more), by the flame-fusion method, compared to the relative ease of producing large-diameter, Czochralski-grown spinel single crystals. Also, with a flame-fusion magnesium aluminate spinel substrate there is a tendency for exsolution of the alumina and cracking of the substrate, which increases with an increase in ratio of MgO to $Al_2O_3$ above 1:1.5, and, therefore, difficulties are encountered when the substrate is heated to about 1,100°C, or above. It has been proposed to use flame-fusion grown magnesium aluminate spinel wherein the ratio of MgO to $Al_2O_3$ is between 1:1 and 1:1.5 to solve the problem of substrate thermal instability, but flame-fusion spinel of this composition was very difficult to prepare without strains and imperfections. It also proved difficult to cut the latter spinel into wafers without cracking.

We have observed that the chemical characteristics of prior-art Czochralski-grown spinel are different from those of flame-fusion spinel. Specifically, Czochralski-grown spinel reacts with hydrogen and forms unwanted solid reaction products which, in the presence of epitaxially deposited silicon thereon, are incorporated into, and degrade the quality of, the silicon deposit. Therefore, relatively poor silicon deposits are obtained if silicon is deposited in a hydrogen atmosphere on prior-art Czochralski-grown spinel. The semiconducting properties of epitaxial silicon deposited on prior-art Czochralski-grown spinel are also not as reproducible as those of epitaxial silicon deposited on the flame-fusion spinel. Since Czochralski-grown spinel, however, can be grown more easily in a single crystal with very good crystal properties and with a relatively larger diameter than that of flame-fusion spinel, it is desirable to use Czochralski-grown spinel in preference to flame-fusion spinel, provided that Czochralski-grown spinel could be used to deposit epitaxial silicon thereon in a hydrogen atmosphere, as in the current state of the art.

The modified Czochralski method of making the novel, modified, Czochralski-grown magnesium aluminate spinel provides a spinel material for a substrate wafer that is relatively free of grain boundaries and impurities which would ordinarily degrade the electronic properties of a thin layer of epitaxial silicon deposited on the surface of the substrate. Also, the novel, modified, Czochralski-grown spinel can be used as a substrate upon which silicon can be deposited in a hydrogen atmosphere.

SUMMARY OF THE INVENTION

The novel, modified, Czochralski-grown, single-crystalline spinel, suitable for a substrate wafer upon which to deposit epitaxial silicon, has a nominal composition of $(MgO)(Al_2O_3)_x$, where $x$ can be between 1 and 2.3, and an (OH) ion content in its lattice that is related to its absorption coefficient $\alpha$, where $\alpha$ is a function of the $MgO/Al_2O_3$ ratio and at wave number 3360 $cm^{-1}$ can be between 0.3 and 3.0 $cm^{-1}$.

The novel, modified, Czochralski-grown, single-crystalline spinel is grown by a modified Czochralski method wherein the single-crystalline spinel is frozen out, from a melt, onto a seed crystal in an ambient comprising oxygen, an inert gas, and water vapor substantially saturating the ambient. The modified Czochralski method produces a single-crystalline magnesium aluminate spinel that is modified with hydroxyl (OH) ions in the lattice of the spinel.

DESCRIPTION OF THE PREFERRED EMBODIMENTS

Czochralski-grown magnesium aluminate spinel epitaxy substrates have shown a marked improvement in desired electronic characteristics when they were modified by the incorporation of hydroxyl ions into their lattices.

Figure 1:
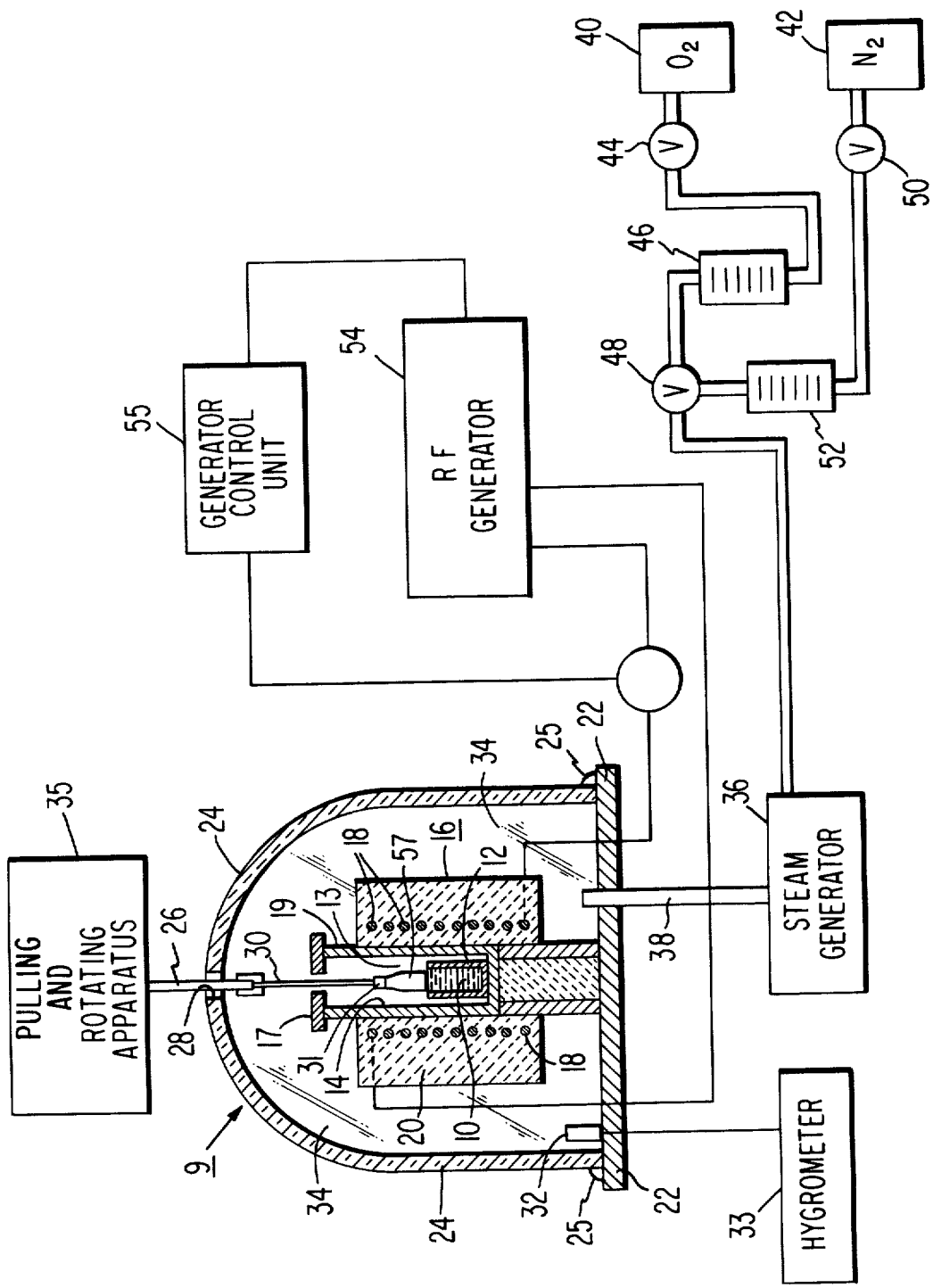
FIG. 1 is a schematic diagram of apparatus for carrying out the modified Czochralski method of making modified, Czochralski-grown spinel.

Referring now to FIG. 1 of the drawings, there is shown apparatus 9 for growing the modified, Czochralski-grown magnesium aluminate spinel by a modified Czochralski method. A mixture 10 of powder or granular MgO and $Al_2O_3$, in a molar ratio of magnesium oxide to aluminum oxide that can vary between 1:1 and 1:2.3, is placed in an iridium crucible 12 that is positioned at a crystal growth station 13 within a central opening 14 of a heating structure 16. The crystal growth station 13 may be partially enclosed by ceramic insulation, as at 17. The heating structure 16 is formed with a water-cooled metal (Cu) coil 18 disposed in a tubular structure 20 of a castable alumina. The coil 18 is made of copper pipe so that it can be water cooled, by any suitable means (not shown). The heating structure 16 is supported on a base plate 22 of metal (Al), by any suitable ceramic heat-insulating means, and surrounded by a "Pyrex" bell jar 24 whose bottom is sealed to the base plate 22 by a suitable sealing ring 25. A rod 26 is disposed vertically through an opening 28 at the top of the bell jar 24 and is adapted to position a vertically disposed seed rod 30, attached distally to it, over the mixture 10. A magnesium aluminate spinel seed crystal 31 with a surface of desired orientation, (111) or (100), for example, facing the mixture 10, is attached to the seed rod 30 by iridium wires (not shown). Pulling (lifting) and rotating apparatus 35 of the type used in a conventional Czochralski-crystal-growing method, is coupled to the rod 26 for the purpose hereinafter described. A sensing element 32 of a hygrometer 33 is disposed within a chamber 34, defined by the base 22 and the bell jar 24, for measuring the humidity within the chamber 34.

Means are provided to produce an ambient substantially saturated with water vapor and comprising between 0.2 and 2.0% oxygen and an inert gas, such as nitrogen, helium, or argon, for example, within the chamber 34 so as to introduce (OH) ions into the crystal lattice of the magnesium aluminate spinel to be formed, whereby to modify the Czochralski-grown spinel. To this end, water vapor from a steam generator 36 is directed into the chamber 34 through a pipe 38 that passes through an opening in the base 22. The steam generator 36 comprises means to boil de-ionized water. Oxygen, $O_2$, from a tank 40 is mixed with an inert gas, preferably nitrogen, $N_2$, from a tank 42 to provide a carrier gas for the steam. The carrier gas is passed over the boiling de-ionized water from the steam generator 36 to carry the steam (water vapor) from the steam generator 36, through the pipe 38, and into the chamber 34. The oxygen from the tank 40 is connected to the steam generator 36 by pipes through a valve 44, a flow meter 46, and a valve 48. The nitrogen from the tank 42 is connected to the steam generator 36 through pipes and a valve 50, a flow meter 52, and the valve 48.

In operation, the water-cooled coils 18 are energized by an rf generator 54, such as one capable of producing 20 kW at a frequency of 450 kHz to heat the iridium crucible 12. The rf generator 54 is controlled by a feedback system, including a control unit 55, of a type known in the art. Thus, the iridium crucible 12 and mixture 10 of MgO and $Al_2O_3$ therein are heated to a temperature (2,130°C ± 50°C) to melt the mixture 10 at the crystal growth station 13. A stream of the carrier gases of oxygen and nitrogen, in a ratio of between 0.2% – 2.0% oxygen and 99.8% – 98.0% nitrogen, is passed through the valve 48, and through the steam generator 36 to carry water vapor into the chamber 34, providing a relative humidity of between 90 and 100% in the chamber 34. The rate of flow of the carrier gas of $O_2$, $N_2$ can be between 1 and 50 cu.ft./hr., and preferably is about 10 cu.ft./hr. Both the oxygen and the nitrogen gases act as a carrier for the steam and are substantially saturated with it.

In practice, the oxygen, the nitrogen, and the steam are first passed through the chamber 34, at a rate of about 10 cu.ft./hr., for abouut an hour to flush the chamber 34. The gases $O_2$, $N_2$, and the steam (water vapor) exit from the chamber 34 through the opening 28 in the bell jar 24. The vertical rods 26 and 30 are rotated by the apparatus 35 at a rate of between 15 and 60 rpm, (preferably 30 rpm), and lowered so that the seed crystal 31 contacts the melt of the mixture 10. The rotating vertical rods 26 and 30 are now pulled upwardly in a vertical direction by the apparatus 35 at a rate of between ¼ inch to 1 inch per hour, and the temperature of the melt is slowly decreased to form a single-crystalline boule 57 of desired diameter. Modified, Czochralski-grown single crystals (boules), substantially free of grain boundaries and impurities and of a diameter of about 2 inches, can be pulled from melts of the type described. When the crystal growth is completed, the rotation rate and melt temperature are slightly increased and the resulting single-crystalline boule 57 is pulled from the melt in from 1 to 2 minutes.

By providing an ambient comprising both steam and oxygen in the chamber 34, the Czochralski method is modified so that hydroxyl (OH) ions are introduced into the lattice of the growing crystal to provide a modified, Czochralski-grown single-crystalline spinel of the nominal composition $(MgO)(Al_2O_3)_x$, where $x$ can be between 1 and 2.3. The (OH) ion content in the lattice of the spinel is related to the infra-red absorption coefficient $\alpha$, which at wave number 3,360 cm$^{-1}$ can have a value of between 0.3 and 3.0 cm$^{-1}$, depending on the value of $x$. The determination of $\alpha$ will hereinafter be explained. The oxygen serves a dual purpose in that it inhibits the vaporization of the MgO from the melt of the mixture 10 and also aids in the incorporation of the hydroxyl ions into the lattice of the modified Czochralski-grown magnesium aluminate spinel. We have observed that no hydroxyl ion absorption occurs in the lattice of the growing spinel if the water vapor saturated ambient at the growth station 13 does not comprise the oxygen gas. Hence, oxygen is essential for the absorption of hydroxyl ions into the spinel lattice. A concentration of oxygen in the ambient of greater than 2%, by volume, is not desirable because oxidation of the iridium crucible 12 increases to a point where the iridium contaminates the melt. It is believed that prior-art Czochralski-grown magnesium aluminate spinel contained little or no hydroxyl ions in its lattice because the spinel was grown in a dry ambient.

Figure 2:
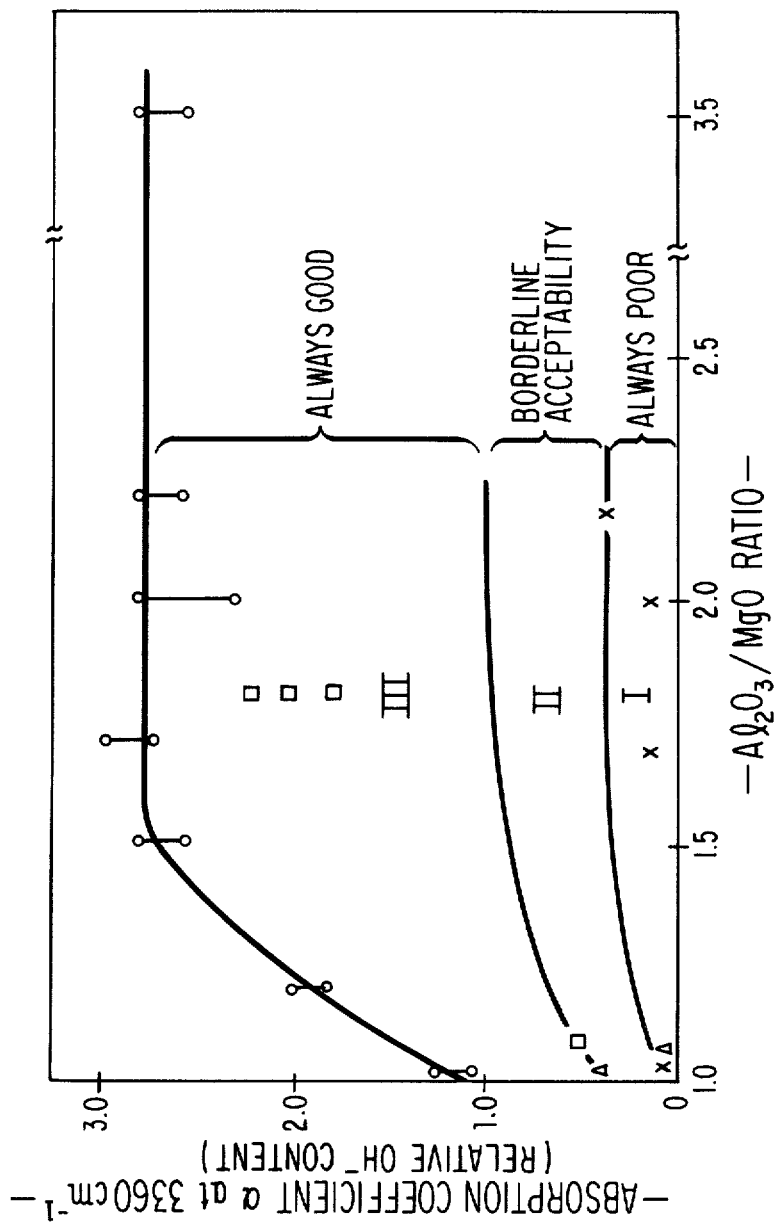
FIG. 2 is a graph showing the (OH) ion absorption coefficients ($\alpha$) for different molar ratios of $Al_2O_3/MgO$ spinel compositions.

Absorption coefficients for hydroxyl ions obtained through infrared spectroscopy at the wave number 3,360 cm$^{-1}$ absorption band indicated an appreciable amount of hydroxyl ions are incorporated into the modified Czochralski-grown magnesium aluminate spinel, as shown in FIG. 2.

The measurement of the absorption coefficient $\alpha$ is as follows:

The absorption coefficient $\alpha$ is defined as $\alpha = \log I_o/I/t$, where $I$ is the measured transmittance at an absorbing wavelength (in this case at wave number 3,360 cm$^{-1}$) and $I_o$ is the measured transmittance at a non-absorbing wavelength (in this case typically at wave number 3,200 cm$^{-1}$) near the absorbing wavelength. $t$ is the thickness of the sample in cm. The wave number is the reciprocal of the wavelength.

The procedure for the measurement of $\alpha$ is descirbed in detail in: 1971 Annual Book of ASTM Standards, Part 8, Doc. No. F-120-70T, "Recommended Practices for Infrared Absorption Analysis of Impurities in Single Crystal Semiconducting Materials."

The absorption coefficient ($\alpha$) is the preferred method for characterization of the substrate material because a comparative measurement of $\alpha$ can be made with greater precision than a chemical analysis of the OH$^-$ content in the low concentration ranges.

Thus, the novel spinel $(MgO)(Al_2O_3)_x$, where $x$ can have a value between 1 and 2.3, has a content of (OH) ions in the lattice that is related to the absorption coefficient $\alpha$ where: $I$ is the intensity of a monochromatic, collimated, infrared, light beam with a wave number of 3,360 cm$^{-1}$ which is passed through a specimen of the spinel, such as a wafer having a thickness $t$. The extent of the absorption of this light beam indicates the presence and relative amount of the (OH) ions in the lattice of the spinel. $I_o$ is the intensity of light measured through the specimen at a nearby wave number (3,200 cm$^{-1}$) which is not absorbed by the (OH) ions in the lattice of the specimen. If $t$ is the thickness of the specimen measured in centimeters, then the absorption coefficient $\alpha$ can vary between 0.3 cm$^{-1}$ and 3.0 cm$^{-1}$ as $x$ in the novel spinel varies between 1 and 3.2, as shown in FIG. 2.

FIG. 2 is a plot of the realtive OH$^-$ content of different spinels as a function of the Al$_2$O$_3$/MgO ratio in the spinels. Curves A, B, and C and their abscissa define three zones I, II, and III into which the chemical and electrical properties of a layer of epitaxial silicon on different substrates of single-crystalline magnesium aluminate spinel fall. The chemical and electrical properties of epitaxial silicon in zone I, between the abscissa and the curve A, are always poor; in zone II, between the curves A and B, the properties are not always reproducible and are of borderline acceptability; and in zone III between the curves B and C, they are always good. The quality (chemical and electrical properties) of the epitaxial silicon deposits is in reference to the hole mobilities in 1.0 $\mu$m thick silicon deposited on (111) and (100) spinel substrate surfaces.

For a given Al$_2$O$_3$/MgO ratio, the OH$^-$ content of flame-fusion spinel, as shown by curve C, is in all cases higher than that of Czochralski-grown spinel. This is believed to be attributed to the fact that the growing surface of the flame-fusion spinel is heated by a H$_2$ - O$_2$ torch; the product of burning being H$_2$O and the hydroxyl component of the H$_2$O being incorporated into the crystal lattice. By contrast, commercially available, prior-art, Czochralski-grown magnesium aluminate spinel is usually grown in a dry ambient in order to avoid the oxidation of the iridium crucible 12. Therefore, commercially available Czochralski-grown spinel, which commonly has a Al$_2$O$_3$/MgO ratio of 1:1, has a relatively low OH$^-$ content. Hence, for a given Al$_2$O$_3$/MgO ratio, the OH$^-$ content of Czochralski-grown magnesium aluminate spinel must be "forced" to a higher value than is present in commercially available Czochralski-grown spinels by the modification of the Czochralski method wherein the spinel is pulled from a melt in a water vapor saturated ambient containing oxygen, as described supra.

Czochralski-grown spinel of the nominal composition (MgO)(Al$_2$O$_3$)$_x$ can be grown so that the value of $x$ can vary between 1 and 2.3. Above the value of $x$ equals 2.3, diffusion of the material across the growth interface is too slow for equilibrium to be established. This results in layers of imperfect material. This situation occurs when the boundary layer builds up too much Al$_2$O$_3$ and its melting point is lowered below that of the bulk material, a condition resulting in constitutional supercooling. It is obvious from FIG. 2 that the (OH) ion content in the lattice of the Czochralski-grown spinel does not increase substantially when the Al$_2$O$_3$/MgO ratio is greater than 2.3.

We claim:

1. In a Czochralski method for growing a single-crystal of spinel material comprising the steps of melting a source of spinel material to form a melt, contacting a seed crystal of the spinel material to a portion of said melt, and relatively moving said seed crystal with respect to said melt, whereby successive portions of said melt are frozen out on said seed crystal, the improvement comprising:
providing an ambient comprising an inert gas and oxygen, saturated with water vapor and contacting said melt, and thus growing said single crystal of spinel material containing OH ions in its lattice.

2. A method in accordance with claim 1, wherein:
said source of spinel material comprises a granular mixture of MgO and Al$_2$O$_3$ in a molar ratio of 1 mol MgO to between 1 and 1.5 mols of Al$_2$O$_3$, and
the improvement comprising mixing between 0.2 and 2.0% O$_2$ gas with between 98.0 and 99.8% of an inert gas, by volume,
passing the mixed gases through a steam generator to substantially saturate them with water vapor, whereby the mixed gases act as a carrier for the water vapor, and
directing the mixed gases saturated with water vapor continuously adjacent said melt.

3. A method in accordance with claim 2, wherein:
said seed crystal has a surface in the (100) or (111) plane, and
said surface is contacted to said melt.

4. A method in accordance with claim 2, wherein:
the step of relatively moving said seed crystal with respect to said melt comprises rotating said seed crystal at a rate of between 15 and 60 rpm while pulling said seed crystal away from said melt at a rate of between ¼ inch and 1 inch per hour.

5. A method of growing single-crystalline, modified, Czochralski-grown magnesium aluminate spinel comprising the steps of:
melting a mixture of MgO and Al$_2$O$_3$ to form a melt,
contacting a seed crystal of said spinel to said melt,
relatively moving said seed crystal with respect to said melt, whereby successive portions of said melt are frozen out on said seed crystal, and
maintaining an ambient comprising an inert gas, oxygen and water vapor, with a humidity of between 90 and 100% adjacent and contacting said melt.

6. A method in accordance with claim 5, wherein:
the molar ratio in said mixture is 1 mol MgO to between 1 and 1.5 mols Al$_2$O$_3$, and
the step of maintaining an ambient comprises continuously directing a mixture of oxygen and nitrogen through a steam generator to substantially saturate said mixture with water vapor, and then directing said mixture with said water vapor adjacent and contacting said melt during the growing of said spinel.

7. A method in accordance with claim 5, wherein:
the step of maintaining an ambient comprises continuously directing a gas mixture of said oxygen and an inert gas through a steam generator to pick up said water vapor, and then directing said mixture substantially saturated with said water vapor continuously adjacent and contacting said melt, the percentage of oxygen in said gas mixture prior to said steam generator comprising between 0.2% and 2.0% by volume.

* * * * *